(No Model.)
J. C. WISWELL.
BATH OR SOLUTION FOR SEPARATING METALS FROM THEIR ORES.
No. 407,386. Patented July 23, 1889.
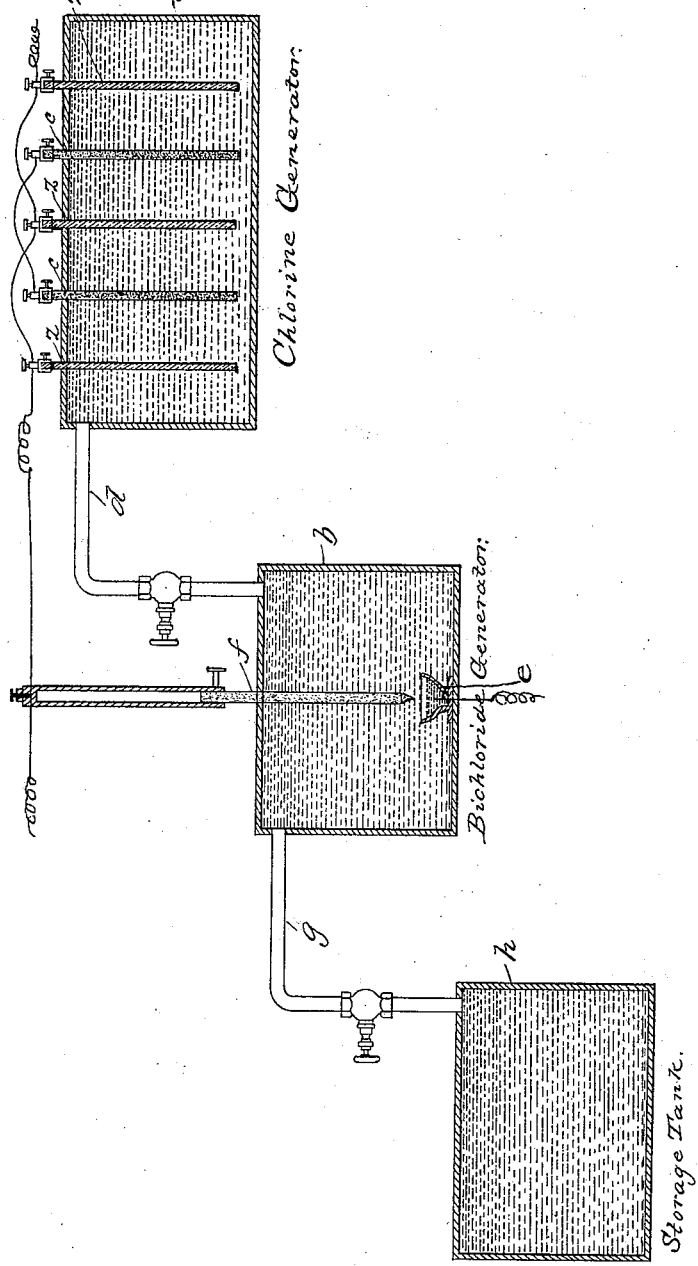

UNITED STATES PATENT OFFICE.

JACOB C. WISWELL, OF MEDFORD, ASSIGNOR, BY DIRECT AND MESNE ASSIGN-
MENTS, TO THE ELECTRIC GOLD AND SILVER CHLORINATION COMPANY,
OF BOSTON, MASSACHUSETTS.

BATH OR SOLUTION FOR SEPARATING METALS FROM THEIR ORES.

SPECIFICATION forming part of Letters Patent No. 407,386, dated July 23, 1889.

Application filed August 13, 1888. Serial No. 282,512. (No specimens.)

*To all whom it may concern:*

Be it known that I, JACOB C. WISWELL, of Medford, in the county of Middlesex and State of Massachusetts, have invented certain new and useful Improvements in the Process of Making Baths or Solutions for Separating Metals from their Ores, of which the following is a specification.

It is the object of my invention to produce an improved process or method whereby baths or solutions for use in separating precious metals from the ores in which they are embedded may be made.

To these ends my invention consists in the improvements which I will now proceed to describe and claim, reference being had to the accompanying drawing, forming a part of this specification, the figure in said drawing representing a sectional view of an apparatus which may be used in the practice of my improved process.

The carrying out of my improved method or process may be set forth as follows: A quantity of salt-water, to which muriate of ammonia and muriatic or sulphuric or other acid in suitable quantities has previously been added, is placed in a tank $a$, termed by me a "chlorine-generator," which tank may be constructed of wood or other suitable material, and the solution so prepared is subjected to a current of electricity by means of a series of zinc plates $z$ and carbon plates $c$, so arranged in the chlorine-generator as to send a continuous current of electricity through the fluid or solution, the carbon plates $c$ serving as the anode or positive pole of an electric excitant and the zinc plates $z$ as the cathode or negative pole. The action of the electric current upon the elements comprising the solution in this tank $a$ results in the generation of aqua-chlorine with great activity, which chlorine is held in solution and ready for the next operation or step in the process—viz., the generation of bichloride of mercury, which may be carried on in a tank $b$, termed by me a "bichloride-generator." The fluid or solution, after treatment in the chlorine-generator $a$, is conveyed to the bichloride-generator $b$ through the pipe $d$, or in any other convenient or suitable way. In the bottom of the bichloride-generator $b$, I arrange a suitable vessel $e$, containing a quantity of liquid mercury, and connect the positive pole of an electric excitant with the liquid mercury in the vessel $e$, (the same serving as the anode,) suspending a carbon plate $f$ over and near the cup or vessel $e$, to which plate I connect the negative pole of an electric excitant, (constituting the same the cathode,) when I subject the solution in the tank $b$ to a current of electricity by the means explained, with the result of rapidly generating bichloride of mercury, which will be held in solution in the liquor or bath, and in this condition may be conveyed through the pipe $g$, or by other suitable means, to the storage-tank $h$.

The solution or bath substantially as hereinbefore set forth may be employed, by proper manipulation, in various processes of freeing precious metals from the several gangues in which they may be embedded, the solution operating in a very speedy and effectual manner.

The bath or solution resulting from the practice of my improved process is not herein claimed, but is made the subject of a separate application for Letters Patent, which application was filed the 3d day of November, 1888, Serial No. 289,919.

Having thus described my invention, what I claim is—

1. The process of producing a bath or solution for the separation of metals from their ores, consisting of subjecting a solution of salt-water, muriate of ammonia, and muriatic acid to a current of electricity, then placing this solution in a tank containing liquid mercury, and subjecting the whole to a current of electricity, said mercury serving as the anode, as set forth.

2. The process of producing a bath or solution for the separation of metals from their ores, consisting in placing aqua-chlorine in a tank containing liquid mercury, and then subjecting the whole to a current of electricity, said mercury serving as the anode, as set forth.

In testimony whereof I have signed my name to this specification, in the presence of two subscribing witnesses, this 10th day of August, A. D. 1888.

JACOB C. WISWELL.

Witnesses:
ARTHUR W. CROSSLEY,
W. C. RAMSAY.